US010478732B2

(12) United States Patent
Torres et al.

(10) Patent No.: US 10,478,732 B2
(45) Date of Patent: Nov. 19, 2019

(54) ARBITRATING AN OUTCOME OF A MULTIPLAYER GAME SESSION

(71) Applicant: Microsoft Technology Licensing, LLC, Redmond, WA (US)

(72) Inventors: Wisgary F. Torres, Bellevue, WA (US); Justin David Brown, Seattle, WA (US); Michael A. Siebert, Seattle, WA (US); Keith R. Kline, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 15/388,379

(22) Filed: Dec. 22, 2016

(65) Prior Publication Data

US 2018/0126282 A1    May 10, 2018

Related U.S. Application Data

(60) Provisional application No. 62/418,678, filed on Nov. 7, 2016.

(51) Int. Cl.
*A63F 13/798* (2014.01)
*A63F 13/46* (2014.01)
(Continued)

(52) U.S. Cl.
CPC ............ *A63F 13/798* (2014.09); *A63F 13/46* (2014.09); *A63F 13/75* (2014.09); *A63F 13/35* (2014.09);
(Continued)

(58) Field of Classification Search
CPC ........ A63F 13/75; A63F 13/798; A63F 13/46; A63F 2300/558; A63F 2300/5586; A63F 2300/61; A63F 2300/63; A63F 2300/638
See application file for complete search history.

(56) References Cited

U.S. PATENT DOCUMENTS

| 7,288,027 B2 * | 10/2007 | Overton ................ G06F 21/128 463/1 |
| 7,367,888 B1 * | 5/2008 | Chen ...................... A63F 13/12 463/1 |

(Continued)

OTHER PUBLICATIONS

Shim, et al., "Team Performance Prediction in Massively Multiplayer Online Role-Playing Games (MMORPGs)", In Proceedings of IEEE Second International Conference on Social Computing, Aug. 20, 2010, pp. 128-136.

(Continued)

*Primary Examiner* — William H McCulloch, Jr.
(74) *Attorney, Agent, or Firm* — Newport IP, LLC; Jacob P. Rohwer

(57) ABSTRACT

An arbitration system is configured to receive, as a set of results data, separate instances of results data from corresponding client computing devices being used to participate in a multiplayer game session. In some examples, an instance of results data comprises input representing an indication or a selection of an identity associated with an outcome of the multiplayer game session. For instance, the input can indicate a participant identity that won the multiplayer game session. In some examples, an instance of results data comprises game data describing the overall activity in a multiplayer game session from a perspective of a player's client computing device, the game data indicating a particular participant identity as a winner of the multiplayer game session. The arbitration system is configured to use the set of results data to determine an arbitrated outcome for the multiplayer game session.

20 Claims, 9 Drawing Sheets

(51) Int. Cl.
*A63F 13/75* (2014.01)
*A63F 13/35* (2014.01)

(52) U.S. Cl.
CPC . *A63F 2300/558* (2013.01); *A63F 2300/5586* (2013.01); *A63F 2300/61* (2013.01); *A63F 2300/63* (2013.01); *A63F 2300/638* (2013.01)

(56) References Cited

U.S. PATENT DOCUMENTS

| | | | | |
|---|---|---|---|---|
| 7,584,154 | B1* | 9/2009 | Chen | G06Q 10/10 463/42 |
| 7,846,024 | B2 | 12/2010 | Graepel et al. | |
| 8,465,355 | B1* | 6/2013 | Liang | A63F 13/46 463/10 |
| 8,583,266 | B2 | 11/2013 | Herbrich et al. | |
| 8,626,710 | B2* | 1/2014 | Harris | A63F 13/71 463/29 |
| 9,352,226 | B2 | 5/2016 | Miura et al. | |
| 10,363,487 | B2* | 7/2019 | Lai | A63F 13/67 |
| 2006/0287099 | A1* | 12/2006 | Shaw | A63F 13/12 463/42 |
| 2007/0129123 | A1* | 6/2007 | Eryou | A63F 13/12 463/1 |
| 2008/0125225 | A1* | 5/2008 | Lazaridis | G07F 17/32 463/41 |
| 2008/0140233 | A1 | 6/2008 | Seacat | |
| 2010/0299313 | A1* | 11/2010 | Orsini | H04L 9/085 707/652 |
| 2013/0324247 | A1* | 12/2013 | Esaki | H04N 21/4312 463/31 |
| 2015/0072775 | A1* | 3/2015 | McDonald | A63F 13/12 463/29 |
| 2015/0238858 | A1 | 8/2015 | Jeffery et al. | |
| 2016/0027260 | A1* | 1/2016 | Pierce | G07F 17/3237 463/7 |
| 2016/0071355 | A1 | 3/2016 | Morrison et al. | |
| 2016/0184712 | A1 | 6/2016 | Colenbrander | |
| 2018/0126282 | A1* | 5/2018 | Torres | A63F 13/798 |
| 2019/0168125 | A1* | 6/2019 | Haile | A63F 13/79 |

OTHER PUBLICATIONS

"Official Xbox One (Won ;)) Thread | Everyone Excited for Battlefield 1! No One Cares for No Mans Sky. | R.I.P. Destiny—p. 869", Retrieved on: Aug. 17, 2016, 11 pages Available at: http://niketalk.com/t/568750/official-xbox-one-won-thread-everyone-excited-for-battlefield-1-no-one-cares-for-no-mans-sky-r-i-p-destiny/26040.

Delalleau, et al., "Beyond Skill Rating: Advanced Matchmaking in Ghost Recon Online", In Journal on IEEE Transactions on Computational Intelligence and AI in Games, vol. 4, Issue 3, Sep. 2012, pp. 167-177.

Shim, et al., "An Exploratory Study of Player and Team Performance in Multiplayer First-Person-Shooter Games", In Proceedings of IEEE Third International Conference on Privacy, Security, Risk and Trust, Oct. 9, 2011, pp. 617-620.

Shim, et al., "Player Performance Prediction in Massively Multiplayer Online RolePlaying Games (MMORPGs)", In Technical Report TR 10-003, Feb. 4, 2010, 10 pages.

Totilo, Stephen, "The PS4's Cloud save System Is Inadequate", Published on: Jul. 29, 2015, 4 pages Available at: http://kotaku.com/the-ps4s-cloud-save-system-is-inadequate-1720892737.

"Store your saved games in the cloud", Retrieved on: Aug. 17, 2016, 3 pages Available at: http://support.xbox.com/en-US/games/game-setup/cloud-save-games.

"Real-time Multiplayer", Retrieved on: Aug. 17, 2016, 7 pages Available at:. https://developers.google.com/games/services/common/concepts/realtimeMultiplayer.

* cited by examiner

ARBITRATING AN OUTCOME OF A MULTIPLAYER GAME SESSION

PRIORITY APPLICATION

This application claims the benefit of and priority to U.S. Provisional Application No. 62/418,678, filed Nov. 7, 2016, the entire contents of which are incorporated herein by reference.

BACKGROUND

A multiplayer game provides players of a video game with the ability to compete against other players either individually or in a team setting. In many multiplayer games, there are a number of scenarios where it is neither a clear nor an efficient way for a system to determine a definitive outcome, such as a winner of the multiplayer game. Rather, existing systems and procedures apply a variety of complex algorithms and/or rule-based evaluations to the separate performances of the game participants in order to determine an outcome of a multiplayer game. Some existing systems and procedures can be costly and inefficient due to the amount of time and computational resources that are required to apply the complex algorithms and/or the rule-based evaluations to the separate performances to determine the outcome. In addition, some existing systems and procedures can leave much to be desired when it comes to the accuracy of the outcome (e.g., results).

SUMMARY

This disclosure describes an arbitration system for determining an outcome of a multiplayer game session. For instance, the outcome can comprise a winning participant of the multiplayer game session, a losing participant of the multiplayer game session, a results ranking of all or at least some of the participants of the multiplayer game session (e.g., first place of the session, second place of the session, third place of the session, and so forth). The arbitration system "arbitrates" an outcome by collecting results data from client computing devices of the participants and validating the results data to ensure that the results data can be relied upon to determine an appropriate winner of the multiplayer game session, for example.

A participant in a multiplayer game session can comprise an individual player of the multiplayer game session, or alternatively, a participant can comprise a team of players in the multiplayer game session (e.g., a team can have two or more players). A multiplayer game session can comprise all or a portion of any category of game that can be executed by computing devices in order to allow participants to partake in the multiplayer game session. For instance, a game can comprise an action game, a fighting game, a war game, a role playing game, a strategy game, a racing game, a sports game, or the like. A game can also be part of training software. A portion of a game that comprises the multiplayer game session can comprise a stage, a level, a round, completion of a particular objective, completion of a particular task, a time period, a match, and so forth.

The arbitration system is configured to receive, as a set of results data, separate instances of results data from corresponding client computing devices being used to participate in the multiplayer game session. In some examples, an instance of results data comprises input representing an indication or a selection of an identity associated with an outcome of the multiplayer game session. For instance, the input can indicate a participant identity (e.g., player identity or team identity) that won the multiplayer game session, a participant identity that lost the multiplayer game session, and/or a performance-based ranking of all or at least some of the participant identities in the multiplayer game session. In some examples, an instance of results data comprises game data describing the overall activity in a multiplayer game session from a perspective of a player's client computing device, the game data indicating a particular participant identity as a winner or a loser of the multiplayer game session. The arbitration system is configured to use the set of results data to determine an arbitrated outcome for the multiplayer game session.

In various examples described herein, an individual instance of results data provides an indication of a winner of the multiplayer game session. Each participant, or in a team setting, each player, can submit an instance of results data. Once the set of results data is received (e.g., various instances of results data are received and aggregated), the arbitration system determines whether a total number of indications for a particular participant identity meets or exceeds a threshold number of indications. The arbitration system sets the threshold number of indications based on a total number of participants in the multiplayer game session and/or a mode or category of the multiplayer game (e.g., a team deathmatch mode, capture the flag mode, king of the hill mode, a role-playing category, a racing category, etc.). In response to determining that the total number of indications for the particular participant identity meets or exceeds the threshold number of indications, the arbitration system determines that the set of results data is valid and the arbitration system can store performance data indicating that the particular identity is an arbitrated winner of the multiplayer game session. Furthermore, the arbitration system can generate and send, to the participating client computing devices, a notification indicating the validity of the set of results data and the winner of the multiplayer game session. Alternatively, in response to determining that the total number of indications for the particular participant identity does not meet or exceed the threshold number of indications, the arbitration system determines that the set of results is invalid and cannot be relied upon to determine an arbitrated outcome. Subsequently, the arbitration system can generate and send, to the participating client computing devices, a notification indicating the invalidity of the set of results data and the lack of an arbitrated outcome.

In various examples, the arbitration system establishes a time period during which instances of results data that are received are deemed to be reliable, and therefore, can be used to arbitrate an outcome. To this end, the arbitration system can determine that an instance of results data is received outside of the time period and can subsequently ignore the instance of results data when arbitrating an outcome. For example, the instance of results data can be determined to be late if received after the time period expires, and therefore, the instance of results data is unreliable and not utilized in determining an arbitrated winner. In one implementation, the time period comprises a predetermined amount of time (e.g., five minutes, ten minutes, twenty minutes, thirty minutes, etc.) after completion of the multiplayer game session.

In various examples, the arbitration system uses trustworthiness data to determine whether the received set of results data is valid or invalid. For instance, trustworthiness data can indicate whether a particular participant identity has previously shown the ability and/or willingness to provide trusted results data (e.g., correctly vote for the winner, provide accurate performance-based rankings, etc.). In one implementation, an indication provided by a participant can be weighted based on a trustworthiness value established for the participant. The arbitration system can determine the trustworthiness value for the participant based on a results history of the participant. The trustworthiness value increases as a number of arbitrated winners correctly indicated (e.g., voted for) by the participant in its results history increases.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
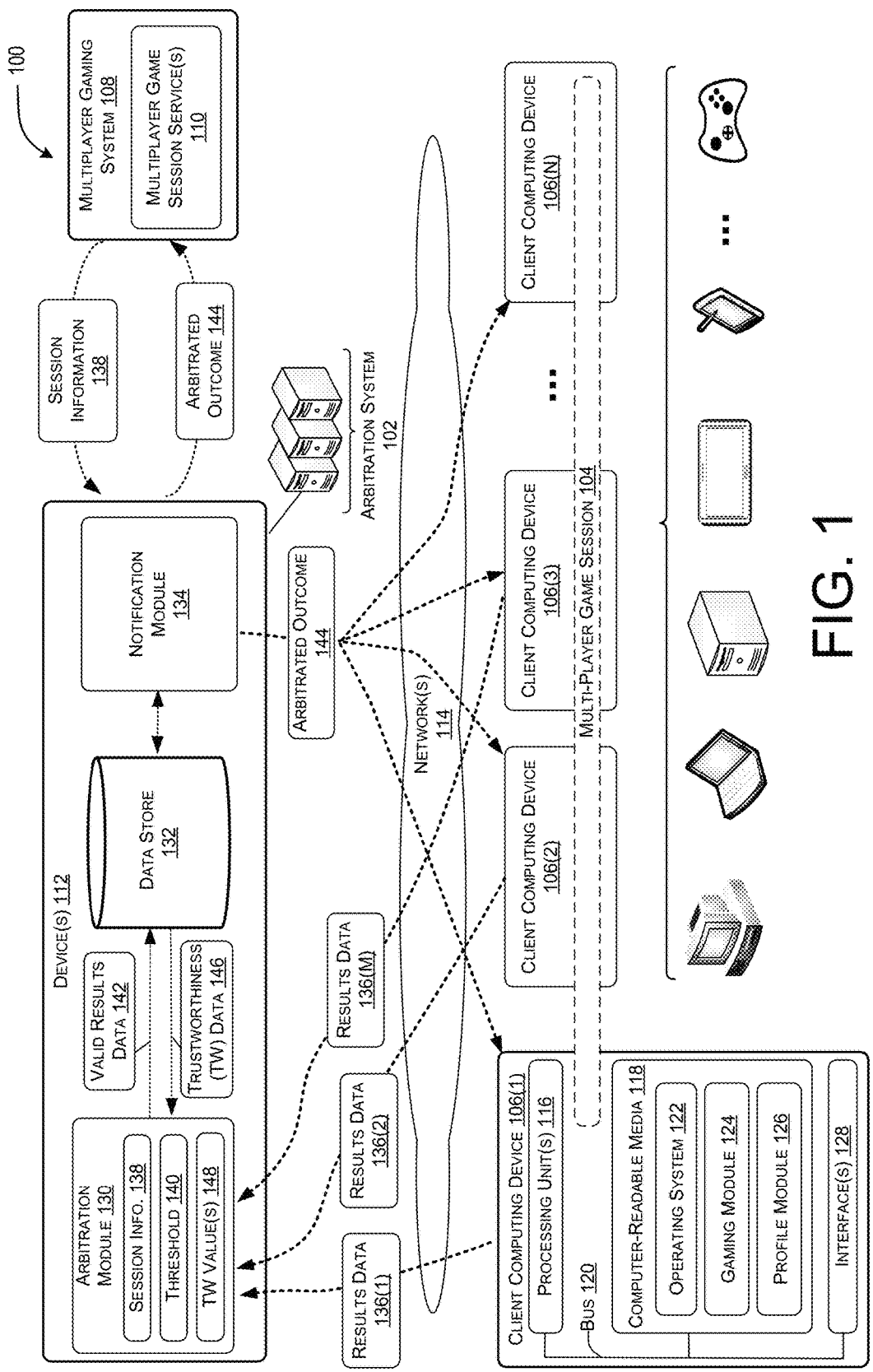
FIG. 1 is a diagram illustrating an example environment in which an arbitration system can operate to determine an outcome of a multiplayer game session based on a set of results data received from client computing devices.

Examples described herein provide an arbitration system that determines an outcome of a multiplayer game session by collecting a set of results data from client computing devices of the participants in the multiplayer game session and validating the set of results data to ensure that the set of results data can be relied upon to correctly determine an outcome of the multiplayer game session (e.g., a winner, a loser, etc.). Because of the use of network-connected client computing devices, each participant may have a different perspective on the activity of the multiplayer game session. For example, the activity can comprise behavior, maneuvers, earned points or a score, and/or achievements of the participants in the multiplayer game session. Consequently, to improve the accuracy with respect to arbitrating an outcome based on input received from the client computing devices, each client computing device and/or participant involved in a multiplayer game session is provided with an opportunity to submit an instance of results data useable to arbitrate an outcome. The arbitration system and/or another system hosting the multiplayer game session can provide the opportunity for the client computing devices to submit instances of results data. An instance of results data can comprise input representing an indication or a selection of a participant identity associated with an outcome of the multiplayer game session. Additionally or alternatively, an instance of results data can comprise game data describing the overall activity in a multiplayer game session from a perspective of a participant's client computing device, and thus, the game data can indicate a particular participant identity as a winner, a loser, and/or a player rank of the multiplayer game session.

As described above, existing systems and procedures typically apply a variety of complex algorithms and/or rule-based evaluations to the separate performances of participants in a multiplayer game session in order to determine an outcome, which can be costly and inefficient. The arbitration system and techniques described herein conserve computing and network resources and/or save time because the systems and services that host a multiplayer game session neither have to buy nor use costly and inefficient algorithms and/or rule-based evaluations. Rather, the systems and services hosting a multiplayer game session can rely upon the arbitration system described herein to perform efficient and cost-effective determination of an outcome (e.g., an arbitrated winner) of the multiplayer game session if the arbitration system can validate the set of results data received from the client computing devices of the participants.

In some examples further described herein, an instance of results data discretely indicates an indication (e.g., a vote) for a winner or a loser of the multiplayer game session. Thus, the arbitration system is configured to collect and count the indications for each multiplayer game session participant that receives an indication. The arbitration system is then configured to determine whether a total number of indications for a particular participant identity that receives a highest number of indications meets or exceeds a threshold number of indications. Based on the determination, the arbitration system determines whether the set of results data submitted by the client computing devices is valid or invalid.

In various examples described herein, the arbitration system is configured to determine the threshold number of indications based on a total number of participants in the multiplayer game session. For instance, as the total number of participants in the multiplayer game session increases, the likelihood of a strong consensus amongst the participants regarding a particular outcome is likely to decrease because there are more possible participants to select as the winner or the loser. Even further, as the total number of participants in the multiplayer game session increases, the likelihood of fraudulent instances of results data negatively affecting an arbitrated outcome will likely decrease. Consequently, in at least some examples, the threshold number of indications decreases as the total number of participants increases. To illustrate, the arbitration system may set the threshold number of indications at 'thirty' for a multiplayer game session with fifty participants (e.g., 60% of the participants and/or client computing devices must select the same winner for the set of results data to be valid). In contrast, the arbitration system may set the threshold number of indications at 'fourteen' for a multiplayer game session with twenty participants (e.g., 70% of the participants and/or client computing devices must select the same winner for the set of results data to be valid). As yet another example, the arbitration system may set the threshold number of indications at 'eight' for a multiplayer game session with ten participants (e.g., 80% of the participants and/or client computing devices must select the same winner for the set of results data to be valid).

Additionally or alternatively, the arbitration system can also consider a mode or category of the multiplayer game when setting the threshold number of indications for a multiplayer game session. Since different modes or categories of games generally require different player actions, it may be easier for client computing devices and/or participants, through their individual perspectives of how the multiplayer game transpires, to evaluate performance of actions in a first mode or category of games compared to evaluating performance of actions in a second mode or category of games. Thus, there is a stronger likelihood of a consensus amongst the client computing devices and/or participants regarding an outcome in the first mode or category of games. Consequently, the arbitration system would set a higher threshold number of indications for a multiplayer game session in the first mode or category relative to a (lower) threshold number of indications set for a multiplayer game session in the second mode or category.

In some examples, the arbitration system establishes a time period during which instances of results data that are received are deemed to be reliable, and therefore, can be used by the arbitration system to arbitrate an outcome. Moreover, the arbitration system can additionally or alternatively use trustworthiness data for the participants to adjust the weights of indications used to determine whether the received set of results data is valid or invalid.

Various examples, scenarios, and aspects are described below with reference to FIGS. 1-9.

FIG. 1 is a diagram illustrating an example environment 100 in which an arbitration system 102 can operate to determine an outcome of a multiplayer game session 104 based on a set of results data received from client computing devices 106(1) . . . 106(N) (where N is a positive integer number such as two, three, four, five, ten, fifteen, twenty, fifty, one hundred, and so forth). In at least one example, the outcome is an arbitrated winner of the multiplayer game session 104, as further described herein. The client computing devices 106(1) . . . 106(N) enable players to participate, individually or as a team, in the multiplayer game session 104. The multiplayer game session 104 can be hosted, over a network, by a multiplayer gaming system 108 (e.g., PLAYSTATION NOW, NINTENDO NETWORK, XBOX LIVE, etc.). That is, the multiplayer gaming system 108 can provide a multiplayer game session service 110 enabling users of the client computing devices 106(1) . . . 106(N) to participate in the multiplayer game session 104. As an alternative, the multiplayer game session 104 can be hosted by one of the client computing devices 106(1) . . . 106(N) without a multiplayer gaming system 108.

The arbitration system 102 comprises device(s) 112. The device(s) 112 and/or other components of the arbitration system 102 can include distributed computing resources that communicate with one another, with the multiplayer gaming system 108, and/or with the client computing devices 106(1) . . . 106(N) via one or more network(s) 114. In some examples, the arbitration system 102 can be part of the multiplayer gaming system 108 (e.g., resources within the system called upon to provide arbitration services), while in other examples, the arbitration system 102 is an independent system that is tasked with arbitrating an outcome for the multiplayer game session 104. As an example, the multiplayer gaming system 108 can be a third-party system that calls upon the arbitration system 102 to reliably arbitrate an outcome.

Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

In some examples, network(s) 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, device(s) 112 can include one or more computing devices that operate in a cluster or other grouped configuration to share resources, balance load, increase performance, provide fail-over support or redundancy, or for other purposes. For instance, device(s) 112 can belong to a variety of classes of devices such as traditional server-type devices, desktop computer-type devices, and/or mobile-type devices. Thus, although illustrated as a single type of device—a server-type device—device(s) 112 can include a diverse variety of device types and are not limited to a particular type of device. Device(s) 112 can represent, but are not limited to, server computers, desktop computers, web-server computers, personal computers, mobile computers, laptop computers, tablet computers, or any other sort of computing device.

A client computing device (e.g., one of client computing device(s) 106(1) . . . 106(N)) can belong to a variety of classes of devices, which can be the same as, or different from, device(s) 112, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a client computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) . . . 106(N) of the various classes and device types can represent any type of computing device having one or more processing unit(s) 116 operably connected to computer-readable media 118 such as via a bus 120, which in some instances can include one or more of a system bus, a data bus, an address bus, a PCI bus, a Mini-PCI bus, and any variety of local, peripheral, and/or independent buses.

Executable instructions stored on computer-readable media 118 can include, for example, an operating system 122, a gaming module 124, a profile module 126, and other modules, programs, or applications that are loadable and executable by processing units(s) 116.

Client computing device(s) 106(1) . . . 106(N) can also include one or more interface(s) 128 to enable communications between client computing device(s) 106(1) . . . 106(N) and other networked devices, such as device(s) 112 and/or devices of the multiplayer gaming system 108, over network(s) 114. Such network interface(s) 128 can include one or more network interface controllers (NICs) or other types of transceiver devices to send and receive communications and/or data over a network.

In the example environment 100 of FIG. 1, client computing devices 106(1) . . . 106(N) can use their respective gaming module 124 to connect with one another and/or other external device(s) in order to participate in the multiplayer game session 104. For instance, a player can utilize a client computing device 106(1) to access a game title. When executing the game title, the player can select a multiplayer mode, which can cause the client computing device 106(1) to connect to a game hosting device and/or other client computing devices 106(2) . . . 106(N) over the network 114. The player can then use the client computing device 106(1) to register as a player, and/or as a member of a team, view and/or play in the multiplayer game session 104, and receive updates and/or results for the multiplayer game session 104.

The client computing device(s) 106(1) . . . 106(N) can use their respective profile module 132 to generate and/or receive participant profiles, and provide the participant profiles to other client computing devices, to game hosting devices, and/or to the device(s) 112 of the arbitration system 102. A participant profile can include one or more of an identity of a participant (e.g., a name, a unique identifier (ID), a gaming ID, etc.), a skill level of the participant, a rating for the participant, an age of the participant, a friends list for the participant, a location of the participant, etc. Participant profiles can be used to register participants for multiplayer game sessions. In some examples, the arbitration system 102 and/or the multiplayer gaming system 108 maintain profile information and relevant historical data (e.g., participant identity, skill, rating, etc.) and can provide, upon request, the profile information to clients and/or services as required and as authorized (e.g., upon receiving authorized player credentials) so that the system can ensure the client or the service is trusted.

As illustrated in FIG. 1, the device(s) 112 of the arbitration system 102 comprises an arbitration module 130, a data store 132, and a notification module 134. The arbitration module 130 is configured to receive, from individual client computing devices 106(1) . . . 106(N), instances of results data 136(1) . . . 136(M) (where M is a positive integer number such as two, three, four, five, ten, fifteen, twenty, fifty, one hundred, and so forth). In some scenarios, not all the client computing devices used to participate in the multiplayer game session 104 provide an instance of results data, and thus, M (the number of instances submitted) may not be equal to N (the number of client computing devices). In FIG. 1, for example, the arbitration module 130 does not receive an instance of results data from client computing device 106(N), which is being used by a player to participate in the multiplayer game session 104. As described above, an instance of results data can comprise input representing an indication or a selection of a participant identity associated with an outcome of the multiplayer game session 104. Additionally or alternatively, an instance of results data can comprise game data describing the overall activity in the multiplayer game session from a perspective of a participant's client computing device, and thus, the game data can indicate a participant identity as an outcome (e.g., a winner or a loser) of the multiplayer game session 104.

The arbitration module 130 is also configured to receive session information 138 and to store the session information 138 in the data store 132. The session information 138 can be received from the client computing devices 106(1) . . . 106(N) along with the instances of results data 136(1) . . . 136(M) and/or as the multiplayer game session 104 is being played (e.g., prior to receiving the instances of results data 136(1) . . . 136(M)). Additionally or alternatively, the session information 138 can be received from the multiplayer gaming system 108, as illustrated in FIG. 1. The session information 138 can include a total number of participants in the multiplayer game session 104, a mode or category of the multiplayer game, activity that occurs in the multiplayer game session 104 (e.g., behavior, maneuvers, earned points or a score, and/or achievements of the participants), and/or other data related to when and how the multiplayer game session 104 is conducted.

In various examples, the arbitration module 130 establishes or sets a threshold 140 for the multiplayer game session 104. The arbitration module 130 can use the threshold 140 to validate the set of results data received from the client computing devices 106(1) . . . 106(N) (e.g., the set of results data being based on the collective instances of results data 136(1) . . . 136(M) submitted for arbitration). The threshold 140 can be set based on the session information 138. For instance, the threshold 140 can comprise a threshold number of indications required for the arbitration system 102 to determine that the set of results is valid results data 142 that can be relied upon to determine an arbitrated outcome 144 (e.g., an arbitrated winning participant identity of the multiplayer game session 104).

The valid results data 142 can be stored in the data store 132 in a variety of forms. For example, the valid results data 142 can comprise performance data stored in association with a winning participant identity. The performance data can be used to determine a rating and/or a skill level for the winning participant identity. Furthermore, the notification module 134 is configured to notify the client computing devices 106(1) . . . 106(N) and/or the multiplayer gaming system 108 of the arbitrated outcome 144.

The threshold number of indications can be based on the total number of participants in the multiplayer game session 104 and/or a mode or category of games to which the multiplayer game session 104 belongs. The arbitration module 130 uses such session information 138 because, as the total number of participants in the multiplayer game session 104 increases, the likelihood of a strong consensus amongst the participants regarding a particular outcome is likely to decrease because there are more possible participants to indicate or select (e.g., vote for) as the winner or the loser, for example. Also, as the total number of participants in the multiplayer game session 104 increases, the likelihood of fraudulent instances of results data negatively affecting an arbitrated outcome will likely decrease. An example of a fraudulent instance of results data may occur when a participant intentionally votes for another participant who clearly or obviously did not win the multiplayer game session 104, for example, because the other participant is a known acquaintance of the voting participant or because the clear or obvious winner is not liked by the voting participant. As an alternative, the threshold number of indications can be based on a number of instances of results data received (e.g., the number 'M' in FIG. 1).

In some examples, the arbitration module 130 receives trustworthiness (TW) data 146, which can be used to determine whether the received set of results data is valid or invalid. The trustworthiness data 146 can be stored in the data store 132, and can comprise trustworthiness value(s) 148, where an individual trustworthiness value 148 correspond to a particular participant identity. The trustworthiness value 148 indicates whether that particular participant identity has previously shown the ability and/or willingness to provide trusted results data. For instance, the arbitration system 102 can maintain a results history for the particular participant identity, and the results history may reveal whether the particular participant identity has historically indicated or selected a correct arbitrated outcome, has provided accurate and reliable performance-based rankings that positively help determine a corrected arbitrated outcome, and so forth. In one implementation, an indication or a selection provided via an instance of results data can be weighted based on a trustworthiness value established for a participant. As an example, if an initially received indication or selection corresponds to a standard or baseline value of "1", then the trustworthiness value changes the initially received indication or selection into a weighted indication or selection that has a value between a minimum weighted value such as "0" if the participant has been determined to be extremely untrustworthy and a maximum weighted value such as "2" if the participant has been determined to be extremely trustworthy. Consequently, a trustworthiness value 148 for a participant increases as a number of arbitrated outcomes correctly indicated by the participant increases (e.g., the trustworthiness value 148 is positively affected). However, if the participant incorrectly indicates a particular outcome, then the trustworthiness value 148 decreases (e.g., the trustworthiness value 148 is negatively affected). Examples of how the trustworthiness values are used to validate the set of results data are further described herein with respect to FIG. 5 and FIG. 6.

In various examples, the arbitration system 102 can be part of the multiplayer gaming system 108. In other examples, the multiplayer gaming system 108 is a third-party system that is external to the arbitration system 102 and that hosts a multiplayer game session service 110 for the multiplayer game session 104. For instance, the third-party system can be operated by game publisher(s), game developer(s), and/or tournament organizer(s). Upon completion of the multiplayer game session 104, the arbitration module 130 of the arbitration system 102 may be configured to request the session information 138 from the third-party system. The arbitration module 130 of the arbitration system 102 may also determine that the third-party system is neither a trusted nor a certified third-party system, and therefore, the arbitration module 130 can provide an opportunity for the client computing devices 106(1) . . . 106(N) to report and/or send the instances of results data 136(1) . . . 136(M) indicating an outcome of the multiplayer game session 104. For example, the arbitration module 130 can generate a prompt via a user interface that enables the players to submit a selection or an indication for an outcome such as a winner of the multiplayer game session 104. In another example, a dedicated game server can act as a source of truth, as it is tracking the true actions of each player in the multiplayer game (e.g., when player A kills player B, the dedicated game server itself knows and tracks the fact that player A kills player B). In yet another example, if a dedicated game server is not available, and the multiplayer game or match is peer-to-peer with one of the client devices designated as a host, then the potentially insecure set of game clients can act as sources of truth. For instance, when player A kills player B, the individual game clients keep track of the fact that player A kills player B, and at the end of the game or match, the aggregated results are counted and each client reports results. In this case, most of the players will not tamper with their game clients to alter the results prior to reporting, and therefore, malicious actors can be detected and identified quickly so that their trustworthiness score can be lowered.

Figure 2:
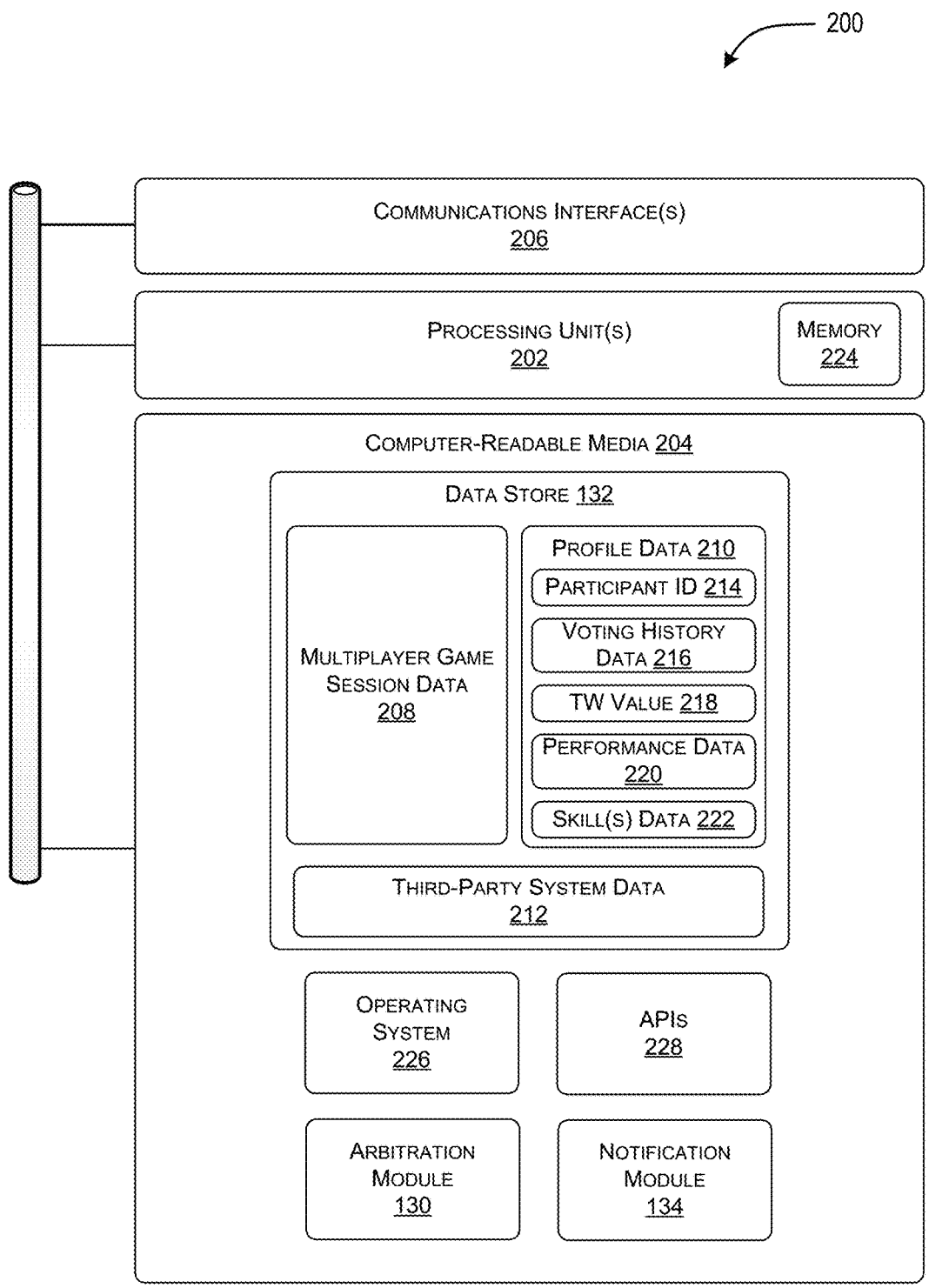
FIG. 2 is a diagram illustrating components of an example device configured to determine an outcome of a multiplayer game session based on a set of results data received from client computing devices.

FIG. 2 is a diagram illustrating components of an example device 200 configured to determine an outcome of a multiplayer game session, such as multiplayer game session 104, based on a set of results data received from client computing devices, such as client computing devices 106(1) . . . 106(N). Device 200 can represent one of device(s) 112. Device 200 includes one or more processing unit(s) 202, computer-readable media 204, communication interface(s) 206. The components of device 200 are operatively connected, for example, via a bus, which can include one or more of a system bus, a data bus, an address bus, a PCI bus, a Mini-PCI bus, and any variety of local, peripheral, and/or independent buses.

As used herein, processing unit(s), such as processing unit(s) 202 and/or processing unit(s) 116, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 204 and/or computer-readable media 118, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 can represent, for example, network interface controllers (NICs) or other types of transceiver devices to send and receive communications over a network.

In the illustrated example, computer-readable media 204 includes the data store 132. In some examples, data store 132 includes data storage such as a database, data warehouse, or other type of structured or unstructured data storage. In some examples, data store 132 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 132 can store data for the operations of processes, applications, components, and/or modules stored in computer-readable media 204 and/or executed by processing unit(s) 202 and/or accelerator(s). For instance, in some examples, data store 132 can store multiplayer game session data 208 (e.g., session information 138), profile data 210, and/or third-party system data 212. The multiplayer game session data 208 can comprise a total number of participants in the multiplayer game session 104, a mode or category of the multiplayer game, activity that occurs in the multiplayer game session 104 (e.g., behavior, maneuvers, earned points or a score, and/or achievements of the participants), and/or other data related to when and how the multiplayer game session 104 is conducted or hosted.

Examples of profile data 210 include, but are not limited to, a participant identity (ID) 214, voting history data 216, a trustworthiness value 218, performance data 220, and/or skills data 222. For example, performance data 220 can include data associated with arbitrated outcomes (e.g., wins) for a corresponding participant ID 214. Moreover, the performance data 220 can be used to determine skills data 222 for the participant ID 214 (e.g., a skill rating or ranking in a particular game mode or category). The profile data 210 can be stored in the form of a player or a team profile.

Third-party system data 212 can include data indicating whether an operator of the third-party system and the gaming services it provides is trusted and/or certified. As described above, if the third-party system is neither a trusted nor a certified system, then the arbitration system 102 may be required to arbitrate the outcome via the instances of results data 136(1) . . . 136(M) received from the client computing devices 106(1) . . . 106(N), rather than rely on results data determined by the third-party system that is neither trusted nor certified.

Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In the illustrated example of FIG. 2, computer-readable media 204 also includes operating system 226 and application programming interface(s) 228 configured to expose the functionality and the data of the device(s) 112 (e.g., example device 200) to external devices associated with, for example, game publishers, game developers, tournament organizers, and/or the participants (e.g., client computing devices 106(1) . . . 106(N)). Additionally, computer-readable media 204 includes one or more modules such as an arbitration module 130 and a notification module 134, although the number of illustrated modules is just an example, and the number can vary higher or lower. That is, functionality described herein in association with the illustrated modules can be performed by a fewer number of modules or a larger number of modules on one device or spread across multiple devices.

Figure 3:
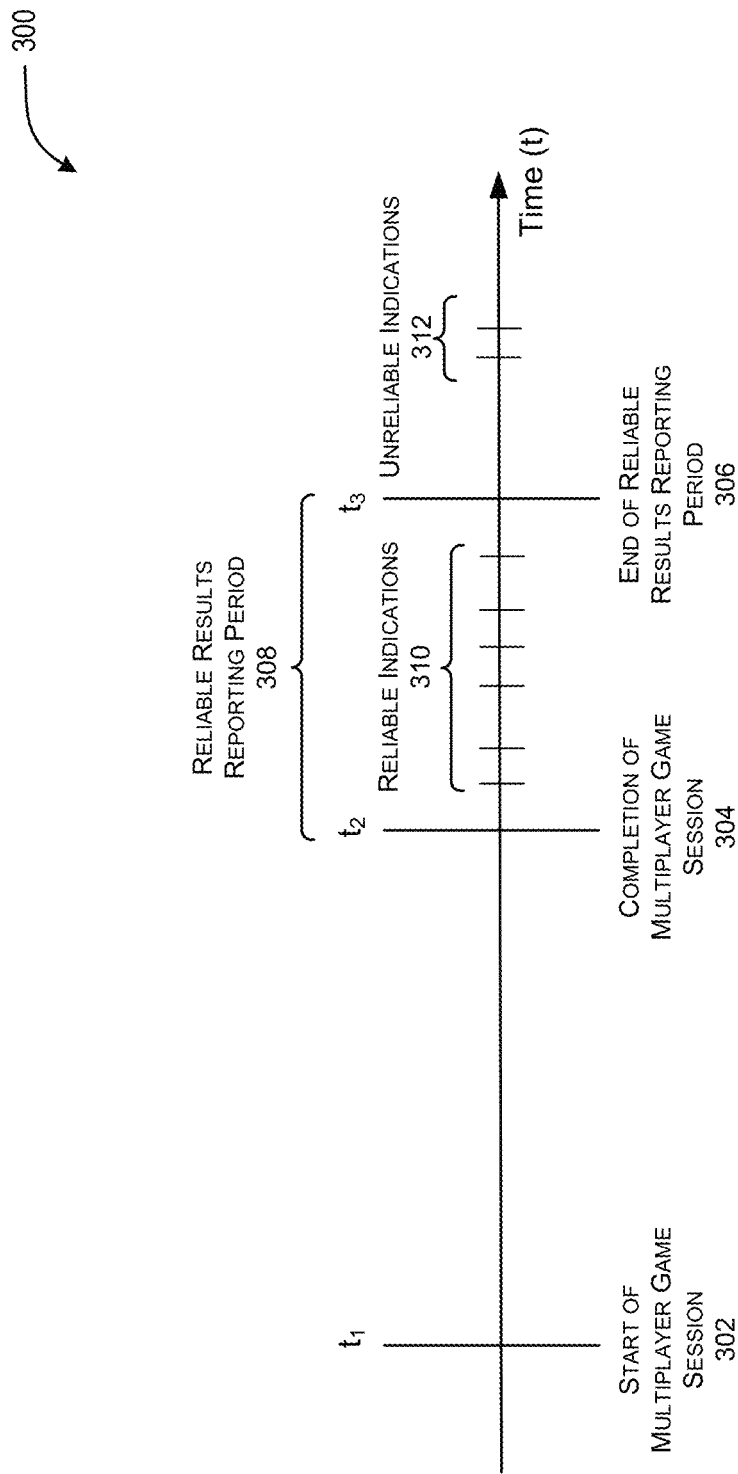
FIG. 3 is an example timeline illustrating a time period during which instances of results data can be reliably received by the arbitration system.

As described above, in some examples, the arbitration system 102 establishes a time period during which instances of results data that are received are deemed to be reliable, and therefore, can be used to arbitrate an outcome of a multiplayer game session 104. FIG. 3 is an example timeline 300 illustrating a time period during which instances of results data can be reliably received by the arbitration system 102. The horizontal axis in FIG. 3 represents time, as illustrated. As referenced by 302, the start of the multiplayer game session occurs at a first time (e.g., time $t_1$). As referenced by 304, the completion of the multiplayer game session occurs at a second time (e.g., time $t_2$). In at least one implementation, the period of time during which client computing devices 106(1) . . . 106(N) can report reliable results (e.g., reliable indications or selections) begins at the time (e.g., time $t_2$) when the multiplayer game session is completed and the period of time ends, as referenced by 306, after a predetermined amount of time (e.g., a pre-set threshold amount of time) expires at a third time (e.g., time $t_3$). Accordingly, the timeline in FIG. 3 illustrates a reliable results reporting period 308 that begins at the time when the multiplayer game session is completed and ends after a predetermined amount of time expires (e.g., the duration of the reliable results reporting period 308 is equal to the predetermined amount of time).

Consequently, indications received by the arbitration system 102 during the reliable results reporting period 308 are deemed to be reliable indications 310 useable by the arbitration system 102 to determine whether a set of results data is valid. In contrast, indications received by the arbitration system 102 outside the reliable results reporting period 308 (e.g., after the predetermined time period expires) are deemed to be unreliable indications 312 that are not used by the arbitration system 102 to determine whether a set of results data is valid (e.g., late instances of results data are ignored when arbitrating an outcome). The predetermined time period comprises a threshold amount of time such as five minutes, ten minutes, twenty minutes, thirty minutes, and so forth.

Figure 4:
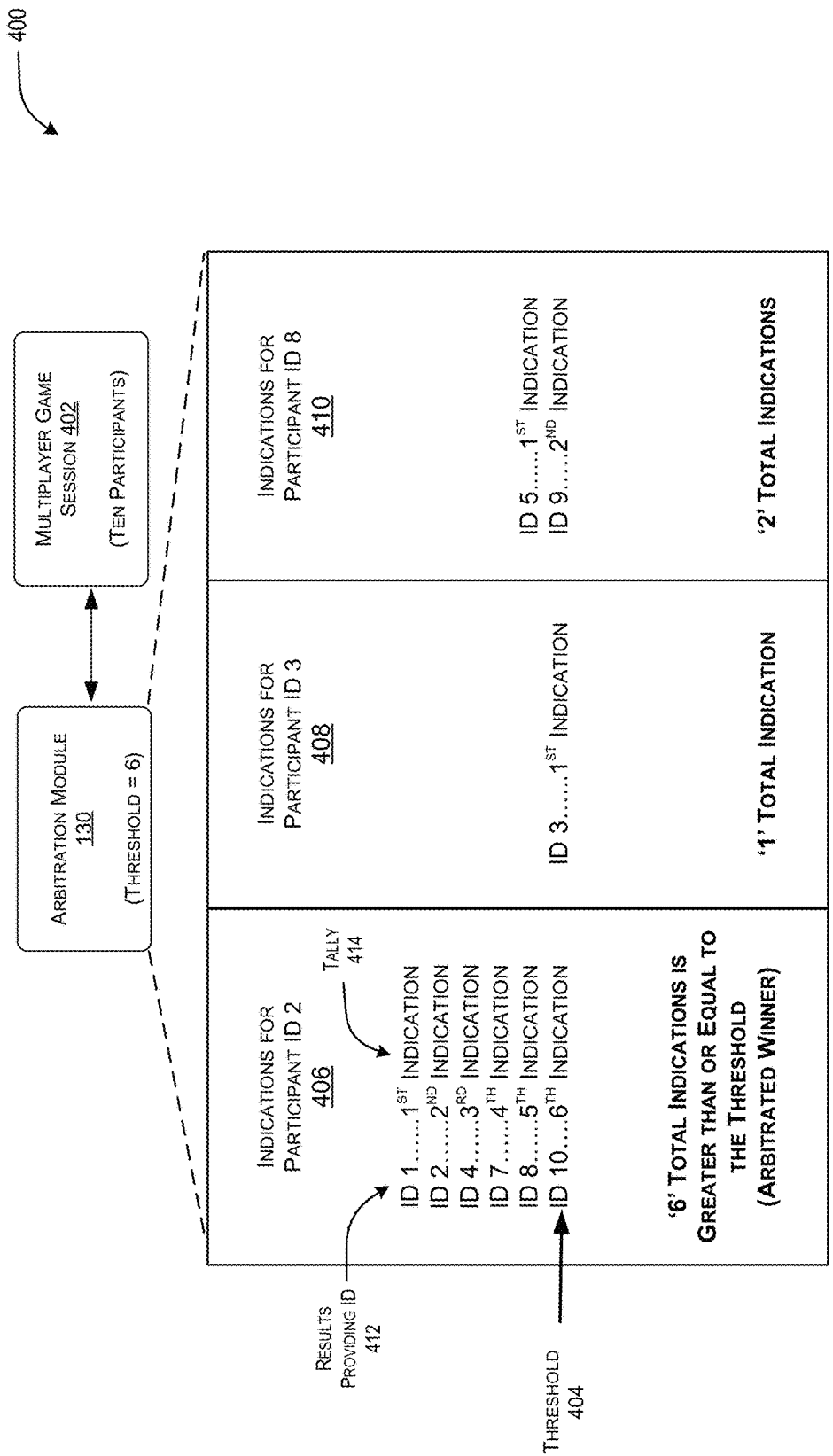
FIG. 4 is a diagram illustrating an example of how the arbitration system uses indications to determine that a set of results data received from client computing devices is valid, and therefore, can be used to determine an arbitrated outcome of a multiplayer game session.

FIG. 4 is a diagram 400 illustrating an example of how the arbitration module 130 of the arbitration system 102 uses indications to determine that a set of results data received from client computing devices 106(1) . . . 106(N) is valid, and therefore, can be used to determine an arbitrated outcome of a multiplayer game session 402. In this example, and for ease of discussion, the multiplayer game session 402 comprises ten participants, and the participant identities of the ten participants stored in the data store 132 and/or the profile module(s) 126 are "ID 1", "ID 2", "ID 3", "ID 4", "ID 5", "ID 6", "ID 7", "ID 8", "ID 9", and "ID 10".

In accordance with FIG. 1 and FIG. 2, the arbitration module 130 is configured to receive instances of results data 136(1) . . . 136(M) from at least some of the client computing devices 106(1) . . . 106(N). An individual instance of results data may indicate an indication associated with an outcome, such as a winner of the multiplayer game session 402. The arbitration module 130 is further configured to set a threshold number of indications. The threshold number of indications can be based on the total number of participants in the multiplayer game session 402 (e.g., ten) and/or on a mode or category of the multiplayer game. In this example, the arbitration module 130 sets the threshold 404 at six indications such that six of the ten participant IDs must indicate or select (e.g., vote for) the same winning participant ID for the set of results data to be valid.

As shown, the arbitration module 130 can sort or batch the indications received based on participant identities, and in this example, three different participant IDs received indications. That is, this example includes a first batch of indications 406 for participant ID 2, a second batch of indications 408 for participant ID 3, a third batch of indications 410 for participant ID 8. Each batch of indications includes a list including the participant ID 412 that submits the results with the indication and a tally 414 (e.g., a vote count). Consequently, batch 406 of FIG. 4 illustrates that "ID 1", "ID 2", "ID 4", "ID 7", "ID 8", and "ID 10" indicated that participant "ID 2" is the winner, and the total tallied number of indications is six. Further, batch 408 of FIG. 4 illustrates that "ID 3" indicated that he or she (or his/her own team) is the winner, and the total tallied number of indications is one. Finally, batch 410 of FIG. 4 illustrates that "ID 5" and "ID 9" indicated that participant ID 8 is the winner, and the total tallied number of indications is two. Note that "ID 6" did not provide an indication, or the indication from "ID 6" was late, and therefore not relied upon by the arbitration module 130 when validating the set of results data.

Based on the tallied batches of indications, the arbitration module 130, in this example, determines that participant ID 2 received the most indications and that the set of results data received is valid because the total number of indications participant ID 2 receives (e.g., six indications) is greater than or equal to the threshold number of indications (e.g., six indications). Consequently, the arbitration module 130 determines that participant ID 2 is the arbitrated winner of the multiplayer game session 402, and performance data 220 associated with this win can subsequently be stored in the data store 132. Moreover, the notification module 134 can generate and send a notification indicating that participant ID 2 is the arbitrated winner of the multiplayer game session 402.

In some examples, the threshold number of indications is increased or decreased by the arbitration module 130 based on a reliability ratio. The reliability ratio includes a total number of reliable indications (e.g., reliable indications 310 in FIG. 3) received from the client computing devices over a total number of identities participating in the multiplayer game session. Consequently, the threshold number of indications can increase based on the reliability ratio increasing, and the threshold number of indications can decrease based on the reliability ratio decreasing.

Figure 5:
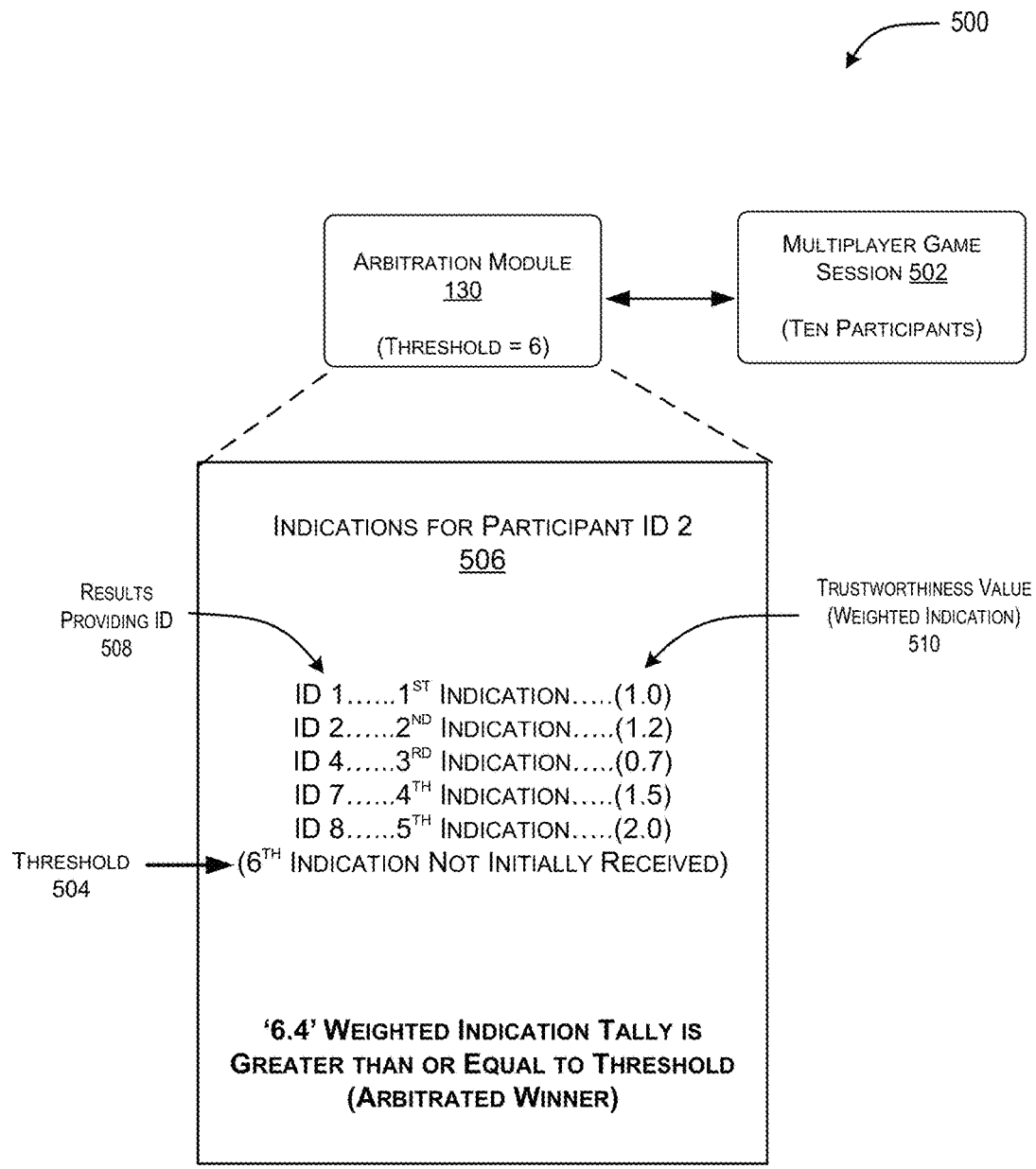
FIG. 5 is a diagram illustrating an example of how the arbitration system uses indications and trustworthiness values to determine that a set of results data received from client computing devices is valid, and therefore, can be used to determine an arbitrated outcome of a multiplayer game session.

FIG. 5 is a diagram 500 illustrating an example of how the arbitration module 130 of the arbitration system 102 uses indications and trustworthiness values 148 to determine that a set of results data received from client computing devices 106(1) . . . 106(N) is valid, and therefore, can be used to determine an arbitrated outcome of a multiplayer game session 502. In this example, and for ease of discussion, the multiplayer game session 502 again comprises ten participants, and the participant identities of the ten participants stored in the data store 132 and/or the profile module(s) 126 are "ID 1", "ID 2", "ID 3", "ID 4", "ID 5", "ID 6", "ID 7", "ID 8", "ID 9", and "ID 10".

In accordance with FIG. 1 and FIG. 2, the arbitration module 130 is configured to receive instances of results data 136(1) . . . 136(M) from at least some of the client computing devices 106(1) . . . 106(N). An individual instance of results data may provide an indication or a selection associated with an outcome, such as a winner of the multiplayer game session 502. The arbitration module 130 is further configured to set a threshold number of indications based on the total number of participants in the multiplayer game session 502 (e.g., ten) and/or on a mode or category of the multiplayer game. In this example, the arbitration module 130 again sets the threshold 504 at six indications such that a winning participant ID needs six indications for the set of results data to be valid.

Similar to the discussion above with respect to FIG. 4, the arbitration module 130 can sort or batch the indications initially received based on participant identities. In this example, only one of the participant IDs that receives indications is illustrated, as batch of indications 506 (e.g., for participant ID 2). The batch of indications 506 similarly includes a list including the participant ID 508 that provides the results with the indication. Consequently, the batch of indications 506 of FIG. 5 illustrates that "ID 1", "ID 2", "ID 4", "ID 7", and "ID 8" indicated that participant "ID 2" is the winner, and the total tallied number of initially received indications is five, which does not meet or exceed the threshold 504 number of indications of six required to validate the set of results (e.g., a sixth indications is not initially received in the set of results data). However, in the example of FIG. 5, the initially received indications are weighted, or adjusted, based on trustworthiness values 510

(e.g., trustworthiness values 148) associated with the participant IDs, to produce weighted indications.

In at least one example (and the example illustrated in FIG. 5), if an initially received indication is associated with a standard value of "1", then the trustworthiness value may itself comprise the weighted indication. Accordingly, FIG. 5 illustrates that the indication received from participant "ID 1" is adjusted by a trustworthiness value to provide a weighted indication of "1" (1*1=1). The indication received from participant "ID 2" is adjusted by a trustworthiness value to provide a weighted indication of "1.2" (1*1.2=1.2). The indication received from participant "ID 4" is adjusted by a trustworthiness value to provide a weighted indication of "0.7" (1*0.7=0.7). The indication received from participant "ID 7" is adjusted by a trustworthiness value to provide a weighted indication of "1.5" (1*1.5=1.5). And the indication received from participant "ID 8" is adjusted by a trustworthiness value to provide a weighted indication of "2.0" (1*2.0=2.0). Looking at the trustworthiness values, it can be deduced that participant "ID 8" (e.g., with a trustworthiness value of 2.0) has historically provided more trustworthy results data compared to that provided by participant "ID 4" (e.g., with a trustworthiness value of 0.7).

Summing up the weighted indications provides a weighted indication tally of "6.4", which is greater than or equal to the threshold number of indications (e.g., six). Consequently, based on the tallied weighted indications, the arbitration module 130 determines that the set of results data is valid in light of the trustworthiness values because the total number of weighted indications for participant ID 2 (e.g., 6.4 votes) is greater than or equal to the threshold number of indications (e.g., six votes), even though the initially received number of indications (prior to the adjustments and weights) does not meet or exceed the threshold. Consequently, the arbitration module 130 uses the trustworthiness values 510 to validate the set of results and to determine that participant ID 2 is the arbitrated winner of the multiplayer game session 502, and performance data 220 associated with this win can subsequently be stored in the data store 132. Moreover, the notification module 134 can generate and send a notification indicating that participant ID 2 is the arbitrated winner of the multiplayer game session 502.

As shown above, the trustworthiness values 510 affect the initially received indications or selections used to determine whether the received results data is valid and/or to determine an arbitrated outcome. The trustworthiness values 510 are used so that results input from trustworthy participants have a greater effect on the arbitrated outcome than results input from untrustworthy participants. The trustworthiness values 510 can be determined based on a participant's results-providing history. For example, a participant may be assigned an initially neutral trustworthiness value (e.g., "1") if the participant is a new player to the arbitration system 102 and has no history. The trustworthy value can then be incremented or decremented, over time and as instances of results data are received, based on whether the participant shows the ability and/or willingness to indicate or select the correct outcome (e.g., correctly vote for the winner). Consequently, a trustworthiness value increases as a number of arbitrated outcomes correctly indicated increases. In some examples, a trustworthy value can increase for a trustworthy participant until it hits a defined maximum value (e.g., "2" such that one initial indication is actually counted as two, "3" such that one initial indication is actually counted as three, etc.). Similarly, a trustworthy value can decrease for an untrustworthy participant until it hits a defined minimum value (e.g., "0" such that one initial indication is not counted at all, "0.5" such that one initial indication is actually only counted as a half of an indication, etc.).

In additional or alternative examples, the arbitration module 130 can track the results history and determine a ratio (e.g., percentage) of correct indications to a total number of indications submitted by a participant. This approach can be implemented once the participant meets a minimum number of total indications such as ten, twenty, fifty, etc. If the ratio indicates the participant is correct 100% of the time, the participant is associated with a predetermined maximum trustworthiness value (e.g., 2.0, 3.0, etc.). If the ratio indicates the participant is correct 0% of the time, the participant is associated with a predetermined minimum trustworthiness value (e.g., 0, 0.5, etc.). Any percentage in between 0% and 100% can be normalized or a mapped to value between the predetermined minimum and maximum trustworthiness values.

Figure 6:
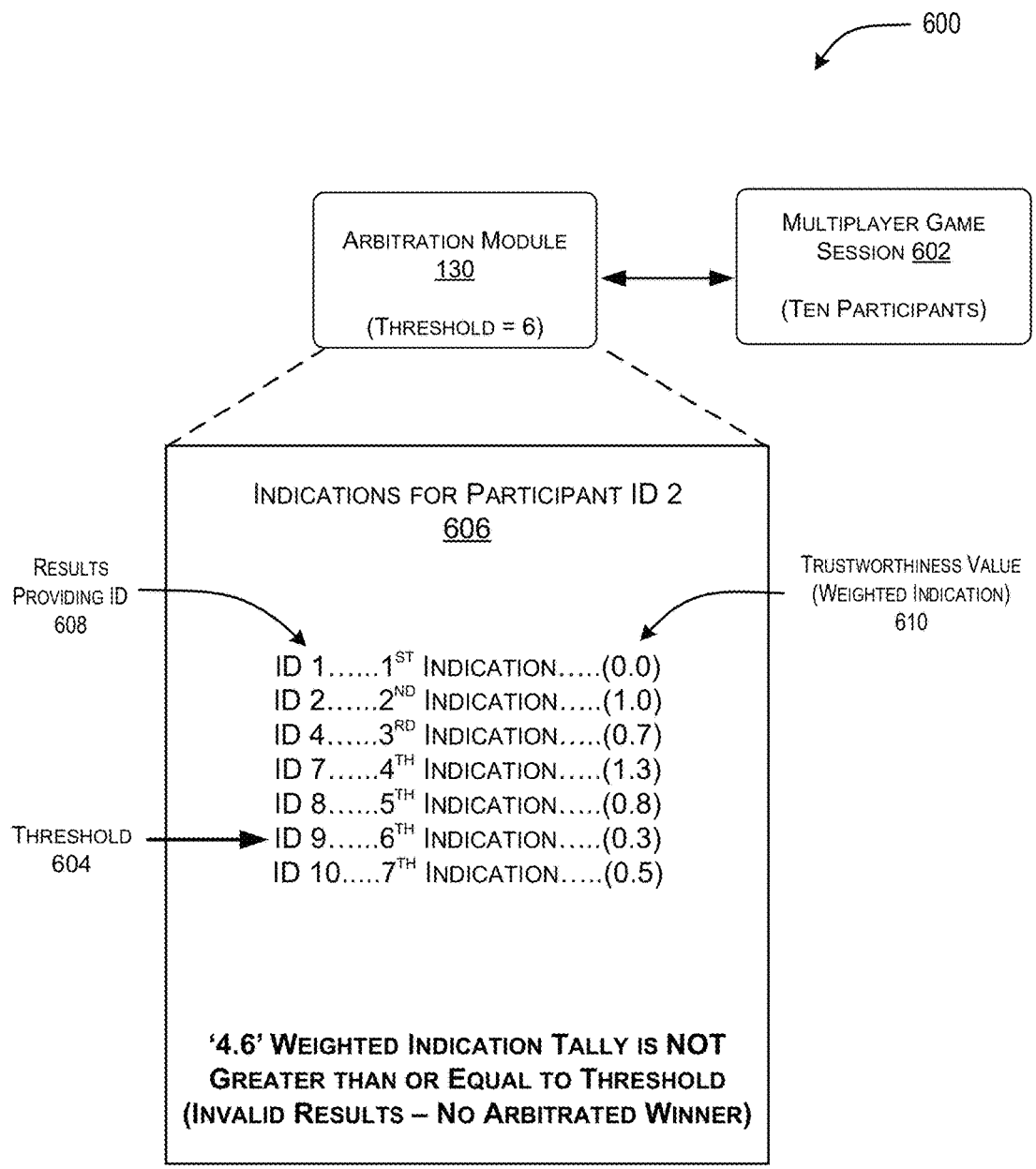
FIG. 6 is a diagram illustrating an example of how the arbitration system uses indications and trustworthiness values to determine that a set of results data received from client computing devices is invalid, and therefore, cannot be used to determine an arbitrated outcome.

FIG. 6 is a diagram 600 illustrating an example of how the arbitration module 130 of the arbitration system uses indications and trustworthiness values 148 to determine that a set of results data received from client computing devices is 106(1) . . . 106(N) invalid, and therefore, cannot be used to determine an arbitrated outcome of a multiplayer game session 602. In this example, and for ease of discussion, the multiplayer game session 602 again comprises ten participants, and the participant identities of the ten participants stored in the data store 132 and/or the profile module(s) 126 are "ID 1", "ID 2", "ID 3", "ID 4", "ID 5", "ID 6", "ID 7", "ID 8", "ID 9", and "ID 10".

In accordance with FIG. 1 and FIG. 2, the arbitration module 130 is configured to receive instances of results data 136(1) . . . 136(M) from at least some of the client computing devices 106(1) . . . 106(N). An individual instance of results data may provide an indication or a selection associated with an outcome, such as a winner of the multiplayer game session 602. The arbitration module 130 is further configured to set a threshold number of indications based on the total number of participants in the multiplayer game session 602 (e.g., ten) and/or on a mode or category of the multiplayer game. In this example, the arbitration module 130 again sets the threshold 604 at six indications such that a winning participant ID needs six indications for the set of results data to be valid.

Similar to the discussion above with respect to FIG. 4 and FIG. 5, the arbitration module 130 can sort or batch the indications initially received based on participant identities. In this example, only one of the participant IDs that receives indications is illustrated, as batch of indications 606 (e.g., for participant ID 2). The batch of indications 606 similarly includes a list including the participant ID 608 that provides the results with an indication. Consequently, the batch of indications 606 of FIG. 6 illustrates that "ID 1", "ID 2", "ID 4", "ID 7", "ID 8", "ID 9", and "ID 10" indicated that participant "ID 2" is the winner, and the total tallied number of initially received indications is seven, which is greater than the threshold 604 number of indications of six required to validate the set of results. Similar to FIG. 5, in the example of FIG. 6, the initially received indications are weighted, or adjusted, based on trustworthiness values 610 (e.g., trustworthiness values 148) associated with the participant IDs, to produce weighted indications.

FIG. 6 illustrates that the indication received from participant "ID 1" is adjusted by a trustworthiness value to provide a weighted indication of "0" (1*0=0). The indication received from participant "ID 2" is adjusted by a trustworthiness value to provide a weighted indication of "1.0"

(1*1.0=1.0). The indication received from participant "ID 4" is adjusted by a trustworthiness value to provide a weighted indication of "0.7" (1*0.7=0.7). The indication received from participant "ID 7" is adjusted by a trustworthiness value to provide a weighted indication of "1.3" (1*1.3=1.3). The indication received from participant "ID 8" is adjusted by a trustworthiness value to provide a weighted indication of "0.8" (1*0.8=0.8). The indication received from participant "ID 9" is adjusted by a trustworthiness value to provide a weighted indication of "0.3" (1*0.3=0.3). And the indication received from participant "ID 10" is adjusted by a trustworthiness value to provide a weighted indication of "0.5" (1*0.5=0.5).

Summing up the weighted indications in the example of FIG. 6 provides a weighted tally of "4.6", which is not greater than or equal to the threshold number of indications (e.g., six). Consequently, based on the tallied weighted indications, the arbitration module 130 determines that the set of results data is invalid in light of the trustworthiness values because the total number of weighted indications for participant ID 2 (e.g., 4.6) is not greater than or equal to the threshold number of indications (e.g., six), even though the initially received number of indications (prior to the adjustments and weights) does meet or exceed the threshold. Consequently, the arbitration module 130 uses the trustworthiness values 612 to determine that the set of results are invalid.

Figure 7:
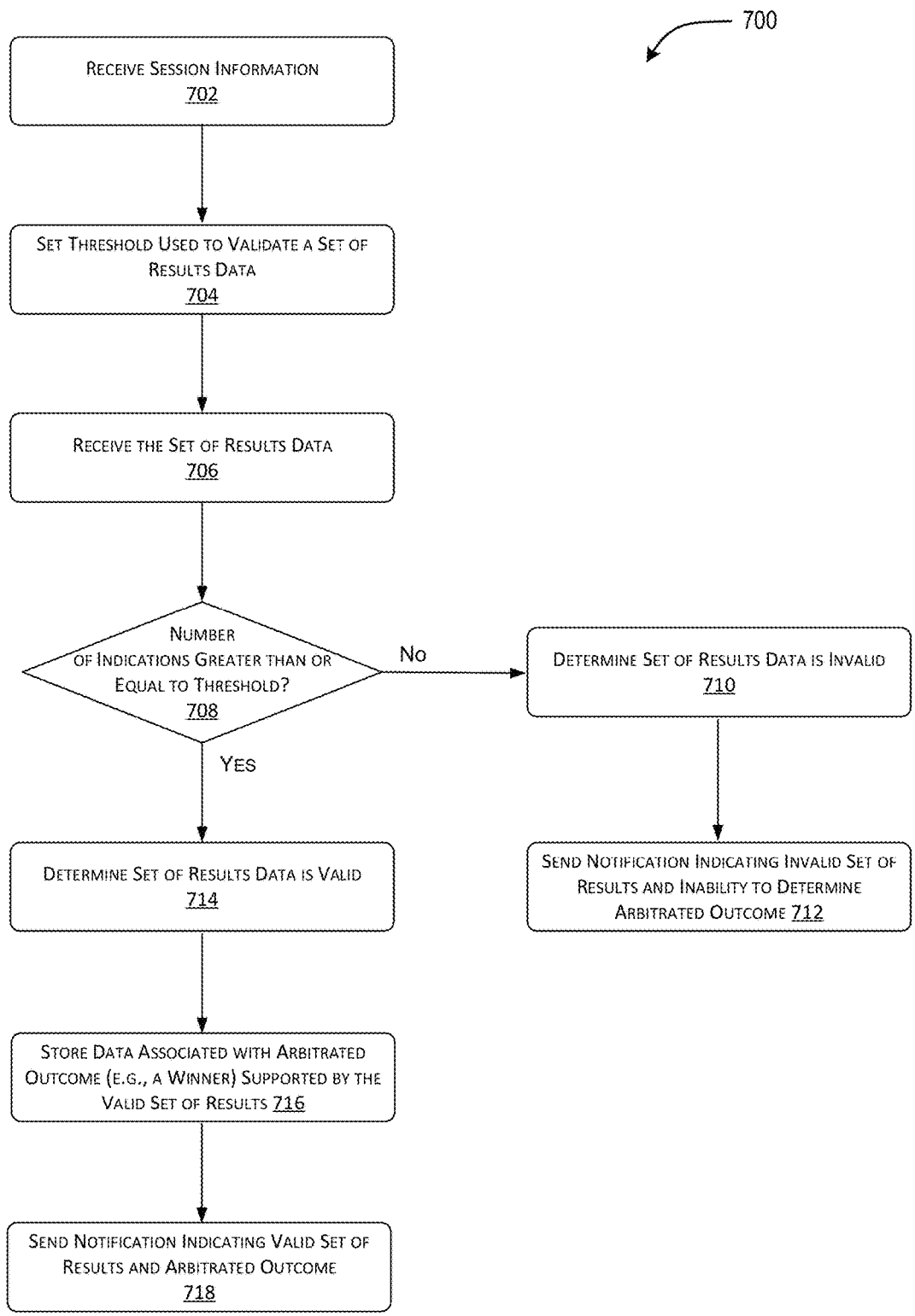
FIG. 7 is a flow diagram of an example method for using indications to determine whether a set of results data received from client computing devices is valid or invalid, and arbitrating an outcome if the set of results are determined to be valid.
Figure 8:
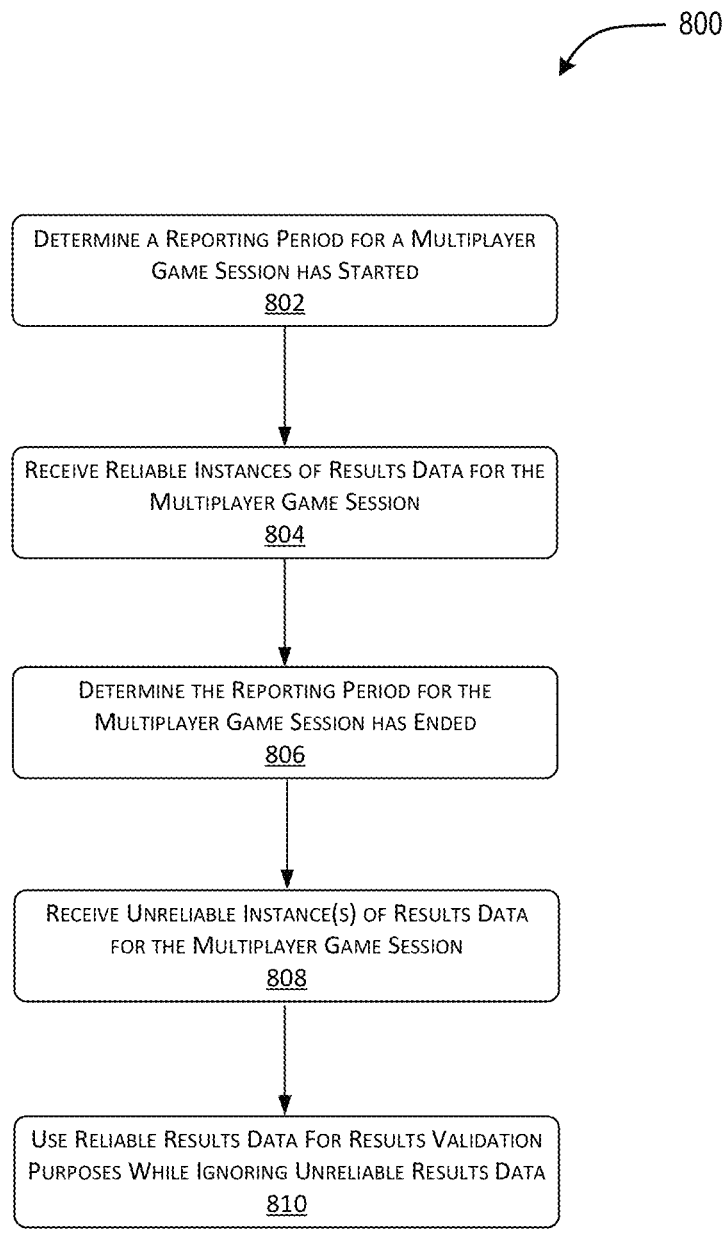
FIG. 8 is a flow diagram of an example method for establishing a time period during which instances of results data can be reliably received by the arbitration system.
Figure 9:
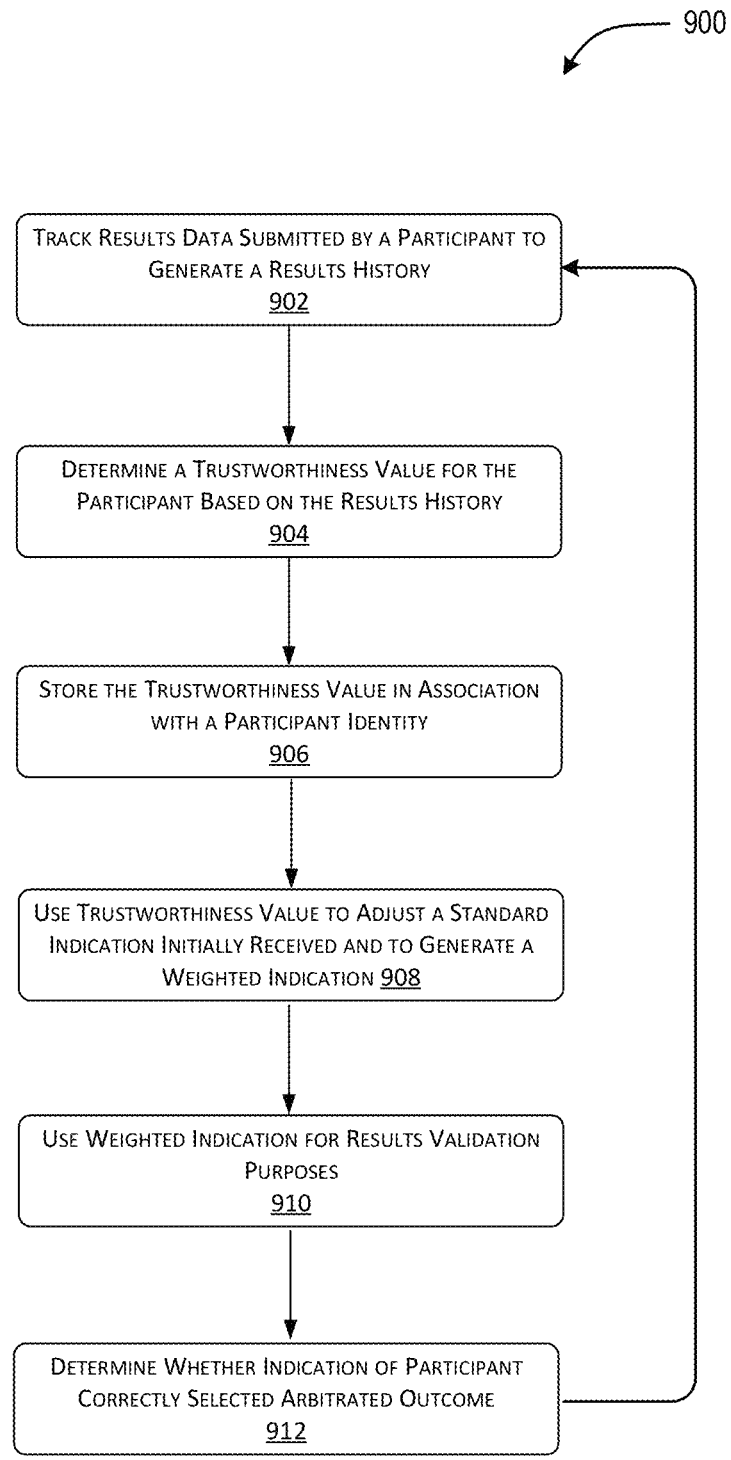
FIG. 9 is a flow diagram of an example method for adjusting a vote based on a trustworthiness value associated with a participant identity.

FIGS. 7-9 represent example processes in accordance with various examples from the description of FIGS. 1-6. The example operations shown in FIGS. 7-9 can be implemented on or otherwise embodied in one or more distributed computing resources such as the device(s) 112 of the arbitration system 102, devices of the multiplayer gaming system 108, and/or the client computing devices 106(1) . . . 106(N). In various examples, example functions can be implemented via user interface(s) served by the arbitration system 102 and/or the host gaming system 108 and accessed by the client computing devices 106(1) . . . 106(N), or as software running on the arbitration system 102 and/or the host gaming system 108. For the sake of illustration, the example processes are described below with reference to processing unit 202 in device 200. However, other processing unit(s) and/or other components associated with other device(s) described herein can carry out operation(s) of described example processes.

The order in which the operations are described in each example flow diagram is not intended to be construed as a limitation, and any number of the described operations can be combined in any order and/or in parallel to implement each process. Moreover, the operations in each of FIGS. 7-9 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations. In the context of hardware, the operations can represent logic functions implemented in circuitry (e.g., datapath-control and finite-state-machine sequencing functions).

FIG. 7 is a flow diagram of an example method 700 for using votes to determine whether a set of results data received from client computing devices is valid or invalid, and arbitrating an outcome if the set of results are determined to be valid.

At 702, processing unit 202 receives session information. For instance, the session information can be received from client computing devices participating in a multiplayer game session and/or from a multiplayer gaming system hosting the multiplayer game session or providing a service to the multiplayer game session. The session information can include a total number of participants in the multiplayer game session, a mode or category of the multiplayer game, activity that occurs in the multiplayer game session (e.g., behavior, maneuvers, earned points or a score, and/or achievements of the participants), and/or other data related to when and how the multiplayer game session is conducted.

At 704, processing unit 202 sets a threshold used to validate a set of results data. The threshold can comprise a threshold number of indications required to validate the set of results data and to determine an arbitrated outcome. In some examples, the threshold number of indications can be based on the total number of participants in the multiplayer game session. In some examples, the threshold number of indications can be based on the mode or category of multiplayer game. In some examples, the threshold number of indications can be based on the reliability ratio described above.

At 706, processing unit 202 receives the set of results data. The set of results data comprises individual instances of results data received from individual ones of the client computing devices participating in the multiplayer game session. In some examples, an instance of results data discretely indicates or selects (e.g., votes for) a particular participant identity as the winning identity.

At 708, processing unit 202 determines whether a number of indications a participant identity receives via the set of results data is greater than or equal to the threshold number of indications. If "no" at 708, the process proceeds to 710 where the processing unit 202 determines the set of results is invalid. Then, at 712, the processing unit 202 can generate and send a notification, to the client computing devices for example, indicating the set of results is invalid and the inability of the arbitration system 102 to determine an arbitrated outcome (e.g., an arbitrated winner).

If "yes" at 708, the process proceeds to 714 where the processing unit 202 determines the set of results is valid. Then, at 716, the processing unit 202 stores data associated with an arbitrated outcome supported by the valid set of results. And, at 718, the processing unit 202 can generate and send a notification, to the client computing devices for example, indicating the set of results is valid and the arbitrated outcome (e.g., an identity of the arbitrated winner) determined by the arbitration system 102. In some examples, individual client computing devices and/or other services have the discretion to decide whether the arbitrated outcome is accepted. For instance, the processing unit 202 can report, along with the arbitrated outcome, an overall trustworthiness score (e.g., on a scale from 0 to 1 where 0 is completely untrustworthy and 1 is fully trustworthy). That way, a service such as a matchmaking/skill service can determine on its own whether to consume the arbitrated outcome data for standard skill calculations. Or a service such as a tournament service can determine on its own whether to consume the arbitrated outcome to award tournament prizes.

FIG. 8 is a flow diagram of an example method 800 for establishing a time period during which instances of results data can be reliably received by the arbitration system.

At 802, processing unit 202 determines that a reporting period for a multiplayer game session has started. For instance, the reporting period can begin at, or approximately at (e.g., within thirty seconds, within a minute, etc.), the time the multiplayer game session has ended.

At 804, processing unit 202 receives reliable instances of results data for the multiplayer game session.

At 806, processing unit 202 determines that the reporting period for the multiplayer game session has ended. As described above, the reporting period can be a predetermined amount of time (e.g., five minutes, ten minutes, fifteen minutes, thirty minutes, etc.).

At 808, processing unit 202 receives unreliable instance(s) of results data for the multiplayer game session (after the reporting period has expired).

At 808, processing unit 202 uses the reliable instances of results data for the multiplayer game session to determine whether the set of results data is valid and can be used to arbitrate an outcome. Moreover, the processing unit ignores, or does not use, the unreliable instance(s) of results data (e.g., received late or outside the reporting period) to determine whether the set of results data is valid and can be used to arbitrate an outcome. Operation 808 can be implemented in association with operation 708 from FIG. 7.

FIG. 9 is a flow diagram of an example method 900 for adjusting an indication based on a trustworthiness value associated with a participant identity.

At block 902, processing unit 202 tracks results data submitted by a participant to generate a results history for the participant.

At block 904, processing unit 202 determines a trustworthiness value for the participant based on the results history.

At block 906, processing unit 202 stores the trustworthiness value in association with an identity of the participant.

At block 908, processing unit 202 uses the trustworthiness value to adjust a standard or baseline indication value (e.g., standard value equal to one) initially received and to generate a weighted indication.

At block 910, processing unit 202 uses the weighted indication for results validation purposes. Operation 910 can be implemented in association with operation 708 from FIG. 7.

At block 912, processing unit 202 determines whether the indication of the participant correctly selected the arbitrated outcome (if determined). Then the process returns to operation 902 where the results history can be updated based on the determination of operation 912. Consequently, the participant's trustworthiness value increases as the number of correct indications of an arbitrated outcome increases.

EXAMPLE CLAUSES

Example Clause A, a system comprising: one or more processing units; and a computer-readable medium having encoded thereon computer-executable instructions to configure the one or more processing units to: receive, as a set of results data, a plurality of instances of results data from a corresponding plurality of computing devices, wherein an individual instance of results data provides an indication of an outcome for an individual identity of a plurality of identities participating in a multiplayer game session; determine that a total number of indications for an identity is greater than or equal to a threshold number of indications, wherein the threshold number of indications is based at least in part on a total number of the plurality of identities participating in the multiplayer game session; and in response to determining that the total number of indications is greater than or equal to the threshold number of indications, determine that the set of results data is valid, and store, in association with the identity and based at least in part on the valid set of results data, data indicating that the identity is an arbitrated winner of the multiplayer game session.

Example Clause B, the system of Example Clause A, wherein the computer-executable instructions further configure the one or more processing units to, in response to determining that the total number of indications is not greater than or equal to the threshold number of indications, generate a notification indicating that the set of results data is invalid data that is unable to be used to determine the arbitrated winner of the multiplayer game session.

Example Clause C, the system of Example Clause A or Example Clause B, wherein the computer-executable instructions further configure the one or more processing units to: determine that at least one computing device provides late results data received outside of a predetermined time period; and ignore the late results data when determining that the set of results data received from the plurality of computing devices indicates the total number of indications for the identity is greater than or equal to the threshold number of indications.

Example Clause D, the system of Example Clause C, wherein the predetermined time period comprises a threshold amount of time after completion of the multiplayer game session.

Example Clause E, the system of any one of Example Clauses A through D, wherein the threshold number of indications increases as a reliability ratio increases, wherein the reliability ratio comprises a total number of reliable indications received from the plurality of computing devices over a total number of identities participating in the multiplayer game session.

Example Clause F, the system of any one of Example Clauses A through E, wherein the computer-executable instructions further configure the one or more processing units to expose the performance data to a plurality of third-party systems via one or more application programming interfaces (APIs).

Example Clause G, the system of any one of Example Clauses A through F, wherein the computer-executable instructions further configure the one or more processing units to determine the threshold number of indications based at least in part on a mode or category of the multiplayer game session.

Example Clause H, the system of any one of Example Clauses A through G, wherein the computer-executable instructions further configure the one or more processing units to use the data to determine a skill rating of the identity.

Example Clause I, the system of any one of Example Clauses A through H, wherein the computer-executable instructions further configure the one or more processing units to: determine that a third-party system that hosts a service for the multiplayer game session is not a trusted system; and provide an opportunity for the plurality of computing devices to send the plurality of instances of results data based, at least in part, on the determination that the third-party system is not the trusted system.

Example Clause J, the system of any one of Example Clauses A through I, wherein the computer-executable instructions further configure the one or more processing units to: access trustworthiness data indicating trustworthiness values for identities that provide the plurality of instances of results data; and weight the indications based at least in part on the trustworthiness values.

Example Clause K, the system of Example Clause J, wherein the computer-executable instructions further configure the one or more processing units to determine a trustworthiness value based at least in part on a results history of a particular identity.

Example Clause L, the system of Example Clause K, wherein the trustworthiness value increases as a number of arbitrated winners correctly indicated by the particular identity increases.

While Example Clauses A through L are described above with respect to a system, it is understood in the context of this document that the subject matter of Example Clauses A through L can also be implemented by a device, via a computer-implemented method, and/or via computer-readable storage media.

Example Clause M, a method, comprising: receiving, as a set of results data, a plurality of instances of results data from a corresponding plurality of computing devices, wherein an individual instance of results data discretely indicates an indication of an outcome for an individual identity of a plurality of identities participating in a multiplayer game session; determining, by one or more processing units, that a total number of indications for an identity is greater than or equal to a threshold number of indications, wherein the threshold number of indications is based at least in part on a total number of the plurality of identities participating in the multiplayer game session; and in response to determining that the total number of indications is greater than or equal to the threshold number of indications, determining that the set of results data is valid, and storing, in association with the identity and based at least in part on the valid set of results data, data indicating that the identity is an arbitrated winner of the multiplayer game session.

Example Clause N, the method of Example Clause M, further comprising: determining that at least one computing device provides late results data received outside of a predetermined time period; and ignoring the late results data when determining that the set of results data received from the plurality of computing devices indicates the total number of indications for the identity is greater than or equal to the threshold number of indications.

Example Clause O, the method of Example Clause N, wherein the predetermined time period comprises a threshold amount of time after completion of the multiplayer game session.

Example Clause P, the method of any one of Example Clauses M through O, further comprising: accessing trustworthiness data indicating trustworthiness values for identities that provide the plurality of instances of results data; and weighting the indications based at least in part on the trustworthiness values.

Example Clause Q, the method of Example Clause P, further comprising determining a trustworthiness value based at least in part on a results history of a particular identity.

Example Clause R, the method of Example Clause Q, wherein the trustworthiness value increases as a number of arbitrated winners correctly indicated by the particular identity increases.

While Example Clauses M through R are described above with respect to a method, it is understood in the context of this document that the subject matter of Example Clauses M through R can also be implemented by a device, by a system, and/or via computer-readable storage media.

Example Clause S, a system, comprising: one or more processing units; and a computer-readable medium having encoded thereon computer-executable instructions to configure the one or more processing units to: receive data representing a multiplayer game session; set a threshold number of indications based at least in part on a mode or category of the multiplayer game session; receive, as a set of results data, a plurality of instances of results data from a corresponding plurality of computing devices, wherein an individual instance of results data discretely indicates an indication of an outcome for an individual identity of a plurality of identities participating in the multiplayer game session; determine that a total number of indications for an identity is greater than or equal to the threshold number of indications; and in response to determining that the total number of indications is greater than or equal to the threshold number of indications, determine that the set of results data is valid, and store, in association with the identity and based at least in part on the valid set of results data, data indicating that the identity is associated with an arbitrated outcome of the multiplayer game session.

Example Clause T, system of Example Clause S, wherein the threshold number of indications is further based at least in part on a total number of the plurality of identities participating in the multiplayer game session.

While Example Clauses S and T are described above with respect to a system, it is understood in the context of this document that the subject matter of Example Clauses S and T can also be implemented by a device, via a computer-implemented method, and/or via computer-readable storage media.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. An arbitration system comprising:
one or more processing units; and
a computer-readable medium having encoded thereon computer-executable instructions to configure the one or more processing units to:
determine that a third-party gaming system hosting a multiplayer game session is not certified for determining an outcome of the multiplayer game session;
in response to determining that the third-party gaming system is not certified for determining the outcome of the multiplayer game session, receive, as a set of results data, a plurality of instances of results data from a corresponding plurality of computing devices, wherein an individual instance of results data provides an indication of an outcome for an individual identity of a plurality of identities participating in the multiplayer game session;
associate a title of the multiplayer game session with a category of multiplayer games;
determine that a total number of indications for an identity is greater than or equal to a threshold number of indications, wherein the threshold number of indications is determined based at least in part on (i) a total number of the plurality of identities participating in the multiplayer game session and (ii) the category of multiplayer games; and
in response to determining that the total number of indications is greater than or equal to the threshold number of indications,
determine that the set of results data is valid, and store, in association with the identity and based at least in part on the valid set of results data, data indicating that the identity is an arbitrated winner of the multiplayer game session.

2. The arbitration system of claim 1, wherein the computer-executable instructions further configure the one or more processing units to, in response to determining that the total number of indications is not greater than or equal to the threshold number of indications, generate a notification indicating that the set of results data is invalid data that is unable to be used to determine the arbitrated winner of the multiplayer game session.

3. The arbitration system of claim 1, wherein the computer-executable instructions further configure the one or more processing units to:
determine that at least one computing device provides late results data received outside of a predetermined time period; and
ignore the late results data when determining that the set of results data received from the plurality of computing devices indicates the total number of indications for the identity is greater than or equal to the threshold number of indications.

4. The arbitration system of claim 3, wherein the predetermined time period comprises a threshold amount of time after completion of the multiplayer game session.

5. The arbitration system of claim 1, wherein the threshold number of indications increases as a reliability ratio increases, wherein the reliability ratio comprises a total number of reliable indications received from the plurality of computing devices over a total number of identities participating in the multiplayer game session.

6. The arbitration system of claim 1, wherein the computer-executable instructions further configure the one or more processing units to expose performance data to a plurality of third-party systems via one or more application programming interfaces (APIs).

7. The arbitration system of claim 1, wherein the threshold number of indications is determined based at least in part on a likelihood of a consensus amongst the plurality of identities given the category of the multiplayer games.

8. The arbitration system of claim 1, wherein the computer-executable instructions further configure the one or more processing units to use the data indicating that the identity is the arbitrated winner of the multiplayer game session to determine a skill rating of the identity.

9. The arbitration system of claim 1, wherein the computer-executable instructions further configure the one or more processing units to:
provide an opportunity for the plurality of computing devices to send the plurality of instances of results data based, at least in part, on the determination that the third-party gaming system hosting the multiplayer game session is not certified for determining the outcome of the multiplayer game session.

10. The arbitration system of claim 1, wherein the computer-executable instructions further configure the one or more processing units to:
access trustworthiness data indicating trustworthiness values for identities that provide the plurality of instances of results data; and
weight the indications based at least in part on the trustworthiness values.

11. The arbitration system of claim 10, wherein the computer-executable instructions further configure the one or more processing units to determine a trustworthiness value based at least in part on a results history of a particular identity.

12. The arbitration system of claim 11, wherein the trustworthiness value increases as a number of arbitrated winners correctly indicated by the particular identity increases.

13. A method performed by an arbitration system, comprising:
- determining that a third-party gaming system hosting a multiplayer game session is not certified for determining an outcome of the multiplayer game session;
- in response to determining that the third-party gaming system is not certified for determining the outcome of the multiplayer game session, receiving, as a set of results data, a plurality of instances of results data from a corresponding plurality of computing devices, wherein an individual instance of results data discretely indicates an indication of an outcome for an individual identity of a plurality of identities participating in the multiplayer game session;
- associating a title of the multiplayer game session with a category of multiplayer games;
- determining, by one or more processing units, that a total number of indications for an identity is greater than or equal to a threshold number of indications, wherein the threshold number of indications is determined based at least in part on (i) a total number of the plurality of identities participating in the multiplayer game session and (ii) the category of multiplayer games; and
- in response to determining that the total number of indications is greater than or equal to the threshold number of indications,
  - determining that the set of results data is valid, and
  - storing, in association with the identity and based at least in part on the valid set of results data, data indicating that the identity is an arbitrated winner of the multiplayer game session.

14. The method of claim 13, further comprising:
- determining that at least one computing device provides late results data received outside of a predetermined time period; and
- ignoring the late results data when determining that the set of results data received from the plurality of computing devices indicates the total number of indications for the identity is greater than or equal to the threshold number of indications.

15. The method of claim 14, wherein the predetermined time period comprises a threshold amount of time after completion of the multiplayer game session.

16. The method of claim 13, further comprising:
- accessing trustworthiness data indicating trustworthiness values for identities that provide the plurality of instances of results data; and
- weighting the indications based at least in part on the trustworthiness values.

17. The method of claim 16, further comprising determining a trustworthiness value based at least in part on a results history of a particular identity.

18. The method of claim 17, wherein the trustworthiness value increases as a number of arbitrated winners correctly indicated by the particular identity increases.

19. An arbitration system, comprising:
- one or more processing units; and
- a computer-readable medium having encoded thereon computer-executable instructions to configure the one or more processing units to:
  - set a threshold number of indications based at least in part on a category of multiplayer games;
  - determine that a third-party gaming system hosting a multiplayer game session is not certified for determining an outcome of the multiplayer game session;
  - in response to determining that the third-party gaming system is not certified for determining the outcome of the multiplayer game session, receive, as a set of results data, a plurality of instances of results data from a corresponding plurality of computing devices, wherein an individual instance of results data discretely indicates an indication of an outcome for an individual identity of a plurality of identities participating in the multiplayer game session;
  - associate a title of the multiplayer game session with the category of multiplayer games;
  - determine, based at least in part on associating the title of the multiplayer game session with the category of multiplayer games, that a total number of indications for an identity is greater than or equal to the threshold number of indications; and
  - in response to determining that the total number of indications is greater than or equal to the threshold number of indications,
    - determine that the set of results data is valid, and
    - store, in association with the identity and based at least in part on the valid set of results data, data indicating that the identity is associated with an arbitrated outcome of the multiplayer game session.

20. The arbitration system of claim 19, wherein the threshold number of indications is further based at least in part on a total number of the plurality of identities participating in the multiplayer game session.

* * * * *